Oct. 26, 1954 R. G. SEAVER Re. 23,889

FUEL INJECTION PUMP

Original Filed June 13, 1952 5 Sheets-Sheet 1

INVENTOR.
ROBERT G. SEAVER
BY Raymond A. Paquin
ATTORNEY.

FUEL INJECTION PUMP

Original Filed June 13, 1952 5 Sheets-Sheet 2

INVENTOR.
ROBERT G. SEAVER
BY Raymond A. Paquin
ATTORNEY.

FUEL INJECTION PUMP

Original Filed June 13, 1952 5 Sheets-Sheet 3

INVENTOR.
ROBERT G. SEAVER
BY
Raymond A. Paquin
ATTORNEY.

FUEL INJECTION PUMP

Original Filed June 13, 1952 5 Sheets-Sheet 4

INVENTOR.
ROBERT G. SEAVER
BY Raymond A. Saguin
ATTORNEY.

FUEL INJECTION PUMP

Original Filed June 13, 1952 5 Sheets-Sheet 5

INVENTOR.
ROBERT G. SEAVER
BY Raymond A. Paquin
ATTORNEY.

Reissued Oct. 26, 1954 Re. 23,889

UNITED STATES PATENT OFFICE 23,889

FUEL INJECTION PUMP

Robert G. Seaver, Springfield, Mass., assignor to American Bosch Arma Corporation, a corporation of New York Original No. 2,683,445, dated July 13, 1954, Serial No. 293,471, June 13, 1952. Application for reissue August 2, 1954, Serial No. 447,451

17 Claims. (Cl. 123—140)

Matter enclosed in heavy brackets [ ] appears in the original patent but forms no part of this reissue specification; matter printed in italics indicates the additions made by reissue.

This invention relates to fuel supply apparatus for internal combustion engines or the like and has particular reference to a new and improved apparatus which is relatively simple, compact and economical in construction and efficient in operation.

An object of the invention is to provide a new and improved fuel supply unit which includes a fuel supply pump, a fuel injection pump, governor and fuel distributor, and wherein all of said elements are combined into a relatively simple, compact, inexpensive unit.

Another object is to provide such a device which is of the spill or bypass type and controls the quantity of fuel delivered by controlling the quantity of fuel bypassed or spilled.

Another object is to provide a device of the type set forth wherein the supply pump, injection pump, governor and fuel distributor are all actuated by the pump drive shaft.

Another object is to provide an apparatus of the type set forth which is relatively simple to assemble and which allows the replacement of parts which may become worn in use.

Another object is to provide a new and improved arrangement for controlling the timing of injection.

Another object is to provide a fuel injection apparatus of the type set forth having torque control means.

Another object is to provide a new and improved combined fuel metering means, fuel injection pump and fuel distributor.

Another object is to provide a new and improved governor arrangement for fuel injection apparatus which is relatively simple and economical in construction, yet efficient in operation.

Other objects and advantages of the invention will be apparent from the following description taken in connection with the accompanying drawings. It will be understood that many changes may be made in the details of construction and arrangement of parts without departing from the scope of the invention as set forth in the accompanying claims, as the preferred form of the invention has been shown and described by way of illustration only.

Referring to the drawings.

Figure 1:
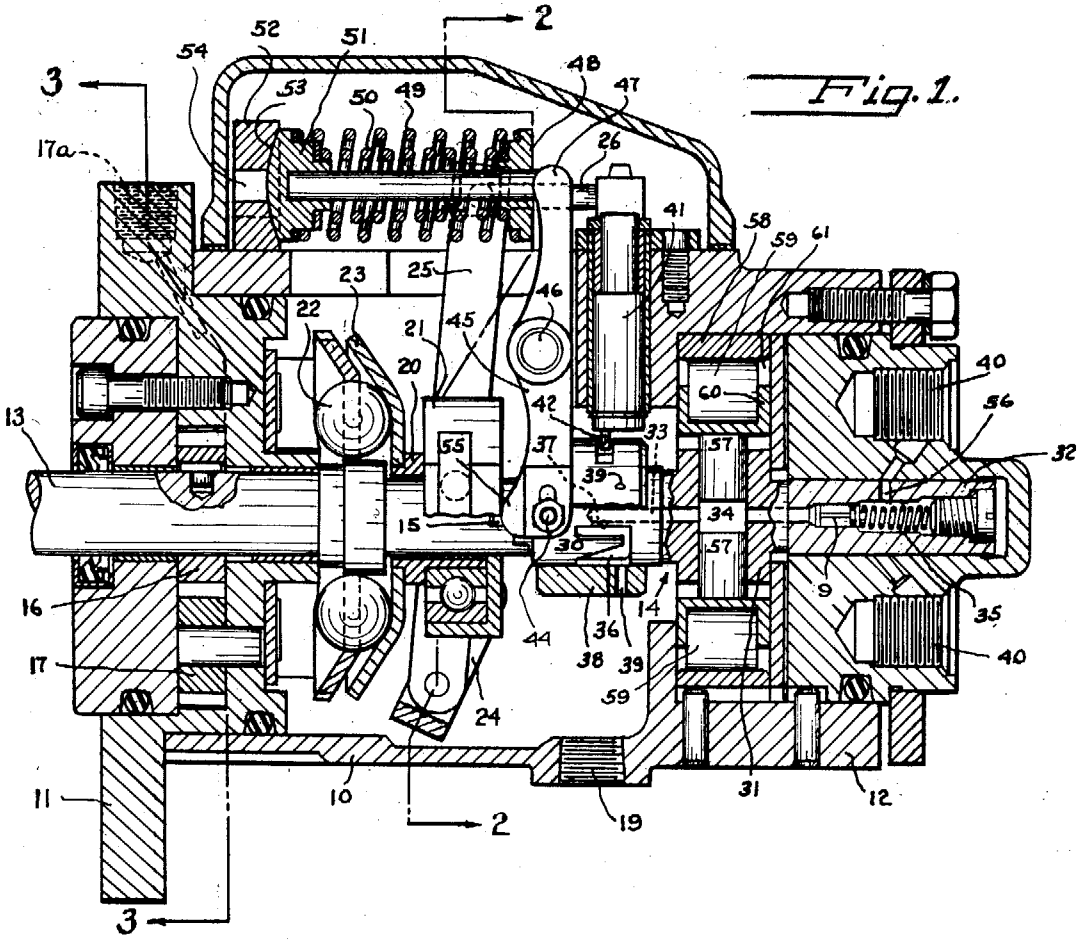
Fig. 1 is a longitudinal sectional view of a fuel supply apparatus embodying the invention.
Figure 2:
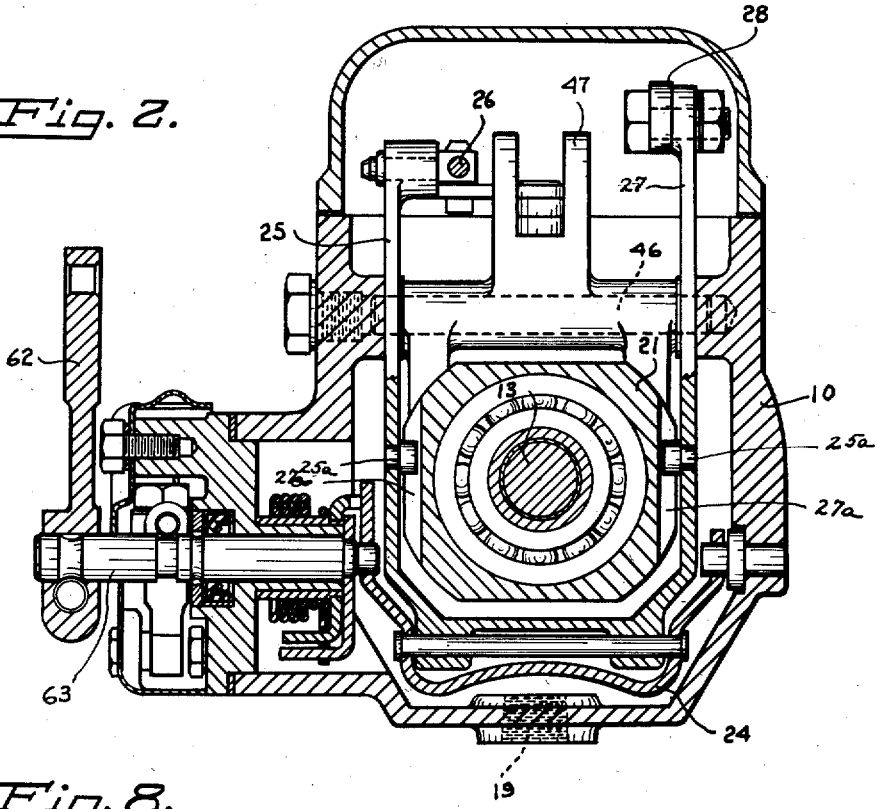
Fig. 2 is a sectional view taken on line 2—2 of Fig. 1, looking in the direction of the arrows.
Figure 8:
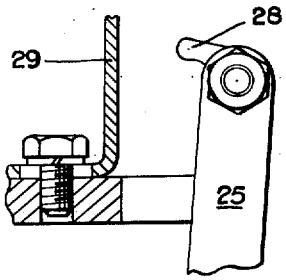
Fig. 8 is a fragmentary view showing the torque control cam and cam plate.
Figure 3:
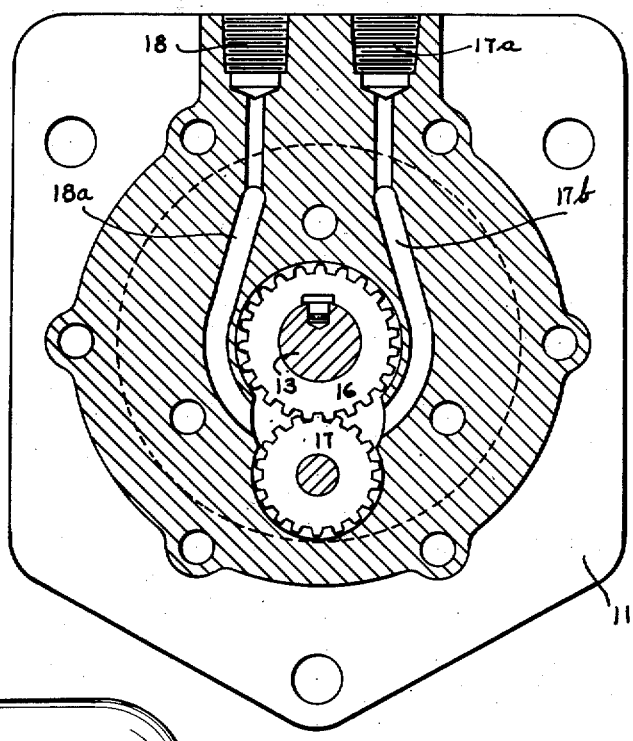
Fig. 3 is a sectional view taken on line 3—3 of Fig. 1, looking in the direction of the arrows.
Figure 5:
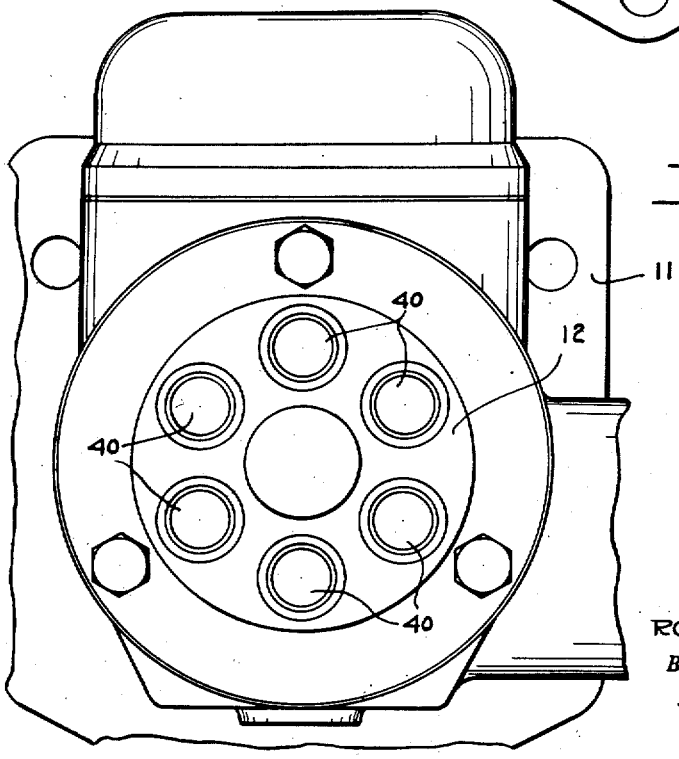
Fig. 5 is an end view of the apparatus showing the distributor end.
Figure 4:
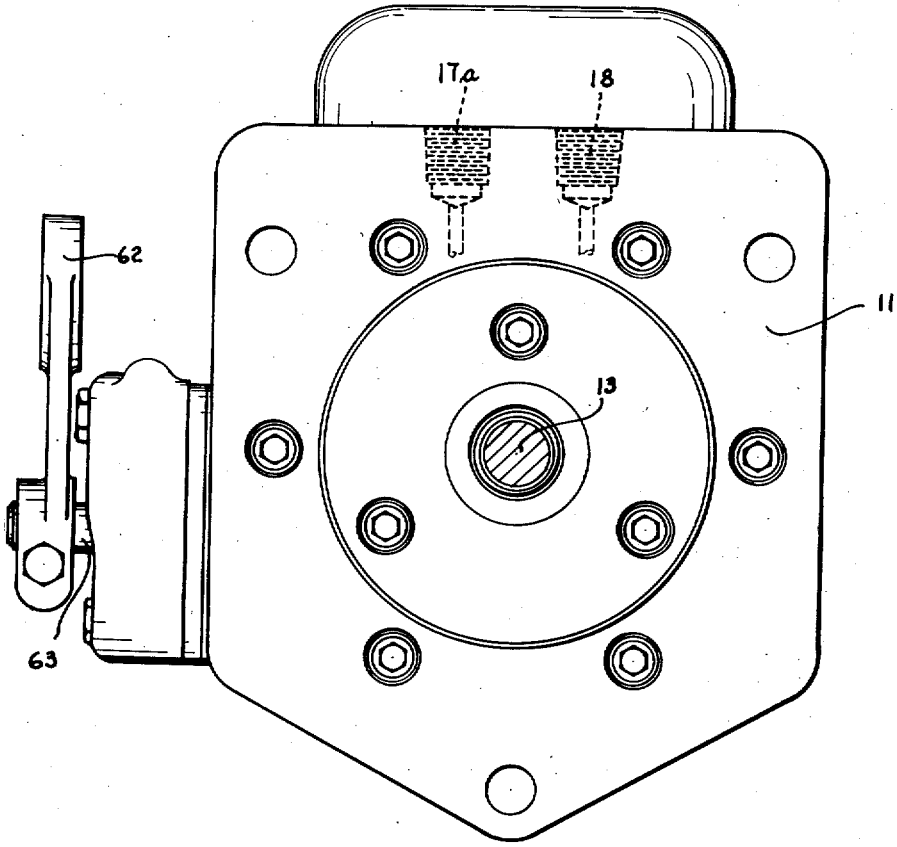
Fig. 4 is an end view of the apparatus showing the drive end.
Figure 6:
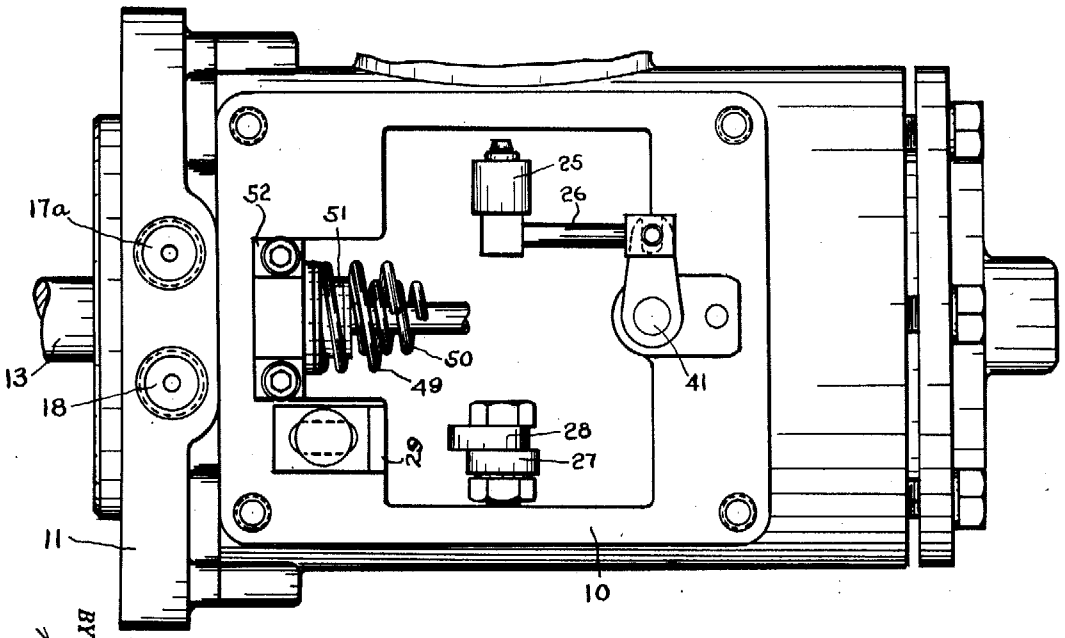
Fig. 6 is a fragmentary view showing the torque control arrangement.
Figure 7:
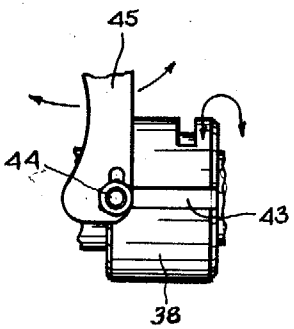
Fig. 7 is a fragmentary view showing the injection timing means.

Referring more particularly to the drawings wherein similar reference characters designate corresponding parts throughout, the apparatus shown embodying the invention comprises a housing 10 having open ends with one end adapted to be closed by the cover or end plate 11, and the opposite end adapted to be closed by the distributing head 12.

The drive shaft 13 extends into housing 10 and is aligned with the pumping and distributing member designated generally at 14 and drive shaft 13 is operatively connected to member 14 by the tongue in groove arrangement 15 or by other suitable means.

On drive shaft 13 is secured gear 16 of the supply pump which meshes with gear 17 to form the fuel supply pump and said supply pump is adapted to receive fuel through one of the ports 17a or 18 and to deliver fuel through the other of said ports, ports 17a and 18 are connected to the supply pump by means of ducts 17b and 18a respectively depending upon the direction of rotation of drive shaft 13. Outlet port 17a or 18, as the case may be, is connected by a pipe line, not shown, to a suitable filter which in turn is connected through another pipe line, not shown, to the pump inlet port 19 through which fuel is supplied into the housing 10 which is kept filled with fuel under supply pressure at all times.

Mounted for sliding movement on drive shaft 13 is collar 20 on which is carried the thrust bearing 21 and sleeve 20 is adapted to be actuated in one direction by the centrifugal arrangement consisting of the balls 22 and cage members 23. If desired, instead of the balls and cages shown, pivotable centrifugal weights could be employed.

On thrust bearing 21 is pivotally mounted yoke 24 to which is pivotally connected governor lever 25 which is connected to the fuel control shaft 26, as hereinafter described. The opposite leg 27 of lever 25 is provided at its upper end with the cam 28 which is adapted to cooperatively function with cam plate 29 for providing torque control, as hereinafter described.

Lever 25 and leg 27 thereof both are provided with pivots 25a mounted for vertical sliding movement in vertical slots 27a in bearing 21.

The torque control feature is obtained through cam 28 on leg 27 of lever 25 and cam plate 29 for pivoting lever 27 about cam plate 29 when said cam 28 is in engagement wtih cam plate 29 and the speed of the engine and pump drops because of increased load whereby said lever 27 will be pivoted to a portion whereby an additional quantity of fuel will be injected, thus giving increased torque or lugging power.

The member 14 comprises the metering portion 30, injection pump portion 31 and distributing portion 32, all of which may be formed integral as shown, or may be formed of separate elements operatively connected and adapted to be driven as a unit.

The metering portion 30 has an axial duct 33 communicating with the bore 34 of the fuel injection pump, and the distributing portion 32 has an axial duct 35 also communicating with the bore 34 of the injection pump.

The metering portion 30 is provided with the helical groove 36 communicating with the axial duct 33 through port 37. Surrounding metering portion 30 is the sleeve 38 having the fill and spill ports 39, one of which is provided for each of the delivery outlets 40 in the distributing member 32. Sleeve 38 is connected to shaft 41 by means of the eccentric 42 whereby upon rotation of shaft 41 through control rod 26, longitudinal adjustment of sleeve 38 on distributing portion 30 is obtained to vary the fuel quantity delivered through control of the quantity of fuel spilled back into the sump in the pump housing.

On the exterior of sleeve 38 is provided longitudinal groove 43 in which rides pin 44 which is connected to pivoted lever 45 which is adapted to be pivoted about pivots 46 and which has its free end 47 engaging spring seat 48 for governor springs 49 and 50, which have their opposite ends engaging spring seat 51 which engages retainer 52. The spring seat 51 and the abutting surface of retainer 52 are spherically shaped at 53 to allow self-centering of the seat 51 and retainer 52 is provided with the opening 54 to provide access to spring seat 51 to aid the changing of the governor springs 49 and 50, as it allows the insertion of an element to force seat 51 against the pressure of the springs and thereby facilitates removal of seats 51 and springs 49 and 50.

Lever 45 has a portion 55 abutting sleeve 20 and adapted to be moved in one direction, thereby upon movement of sleeve 20 and in the opposite direction by means of governor springs 49 and 50. This movement of pin 44 in groove 43 effects pivotal movement of metering member 38, thereby changing the relation between ports 39 and helical groove 36 to correspondingly change the timing of injection by the apparatus.

The distributing portion 32 is provided with the port 56 adapted to be aligned with the various outlets 40 successively upon rotation of distributor members 32 and thereby place the particular outlets in communication with the bore 34 of the injection pump successively, and thereby effect injection into the various combustion chambers successively.

The injection pump portion 31 comprises a pair of opposed plunger elements 57 in bore 34 and adapted to be actuated by internal cam 58 through means of the rollers 59, which are retained in shoes 60 which are mounted for sliding movement in bores 61 whereby upon rotation of member 31, the pistons will be forced outwardly through the combined action of centrifugal force and the fuel supply pressure of the pistons will be forced inwardly on their pumping strokes by means of suitable lobes on the internal cam 58, one pair of opposed lobes being provided for each injection stroke to be made by the plungers.

The manual control lever 62 is connected to shaft 63 for controlling yoke 24 which controls the setting of lever 25 and thereby provides a manual control for the pump setting.

In the operation of the apparatus, fuel is supplied to the supply pump through port 17a and duct 17b or port 18 and duct 18a, depending upon the direction of rotation of drive shaft 13, as previously described, and fuel is delivered from the other of said ducts and ports through a pipe line to a filter from which it passes through port 19 into the sump or hollow interior of housing 10.

Upon the suction stroke of plungers 57, fuel is supplied to bore 34 of the injection pump through ports 39, helical groove 36, port 37 and axial duct 33.

Upon the pumping stroke of plungers 57, fuel is delivered through axial duct 35 in distributor 32 and port 56 to one of the outlets 40 until helical groove 36 is aligned with one of the fill and spill ports 39 at which time fuel is spilled back into the sump of the pump through port 39.

This cycle is repeated for each of the outlets 40 successively to thereby supply fuel under injection pressure to each combustion chamber in proper sequence.

The fuel quantity delivered is controlled by the centrifugal governing arrangement through control of the longitudinal position of sleeve 38 and port 39 relative to helical groove 36 and the timing of injection of the pump is controlled through the centrifugal governing arrangement effecting rotational or pivotal movement of sleeve 38, as previously described.

If desired, instead of the mechanical torque control arrangement shown, a hydraulic torque control arrangement can be obtained by placing a delivery valve in bore or duct 35 of distributor 32 and incorporating the torque control feature therein. This also allows the use of a delivery valve 9 and the delivery valve 9 can have the torque control feature or not, as desired.

It will also be noted that by forming internal cam 58 with staggered or offset lobes with one plunger leading the other that an arrangement could be provided for use for preinjection, that is, a small injection before or after the main injection.

From the foregoing it will be seen that I have provided simple, efficient and economical means for obtaining all of the objects and advantages of the invention.

I claim:

1. In a device of the character described, a drive shaft, a rotor having a fuel pumping portion, a fuel metering portion and a fuel distributing portion parallel with and operatively connected to said drive shaft, said metering portion and distributing portion being on opposite sides of said pumping portion, a fuel passage in said rotor connecting said pumping portion with said distributing portion, a delivery valve in said fuel passage, a plurality of outlets communicating with said distributing portion, said pumping portion having a transverse bore communicating with said fuel passage, plunger means mounted for reciprocation in said bore and cam means surrounding said pumping portion and adapted to effect reciprocation of said plunger means upon rotation of said rotor.

2. In a device of the character described, a drive shaft, a rotor having a fuel pumping portion, a fuel metering portion and a fuel distributing portion parallel with and operatively connected to said drive shaft, said metering portion and distributing portion being on opposite sides of said pumping portion, a fuel passage in said rotor connecting said pumping portion with said distributing portion, a delivery valve in said fuel passage, a plurality of outlets communicating with said distributing portion, said pumping portion having a transverse bore communicating with said fuel passage, plunger means mounted for reciprocation in said bore and cam means surrounding said pumping portion and adapted to effect reciprocation of said plunger means upon rotation of said rotor, said metering portion having high pressure metering means communicating with said pumping portion for controlling the quantity of fuel delivered by said pumping portion.

3. In a device of the character described, a drive shaft, a rotor having a fuel injection pump portion, a fuel metering portion and a fuel distributing portion operatively connected to said drive shaft, said metering portion and distributing portion being on opposite sides of said pumping portion, said injection pump portion having a transverse bore, piston means in said bore, cam means surrounding said piston means for effecting reciprocation of said piston means upon rotation of said rotor, said rotor having a bore connecting said injection pump portion with said fuel metering portion and said fuel distributing portion, a plurality of outlets adapted to communicate successively with said fuel distributing portion, said fuel metering portion including a spill or bypass port and adjustable means for controlling the quantity of fuel spilled or bypassed and providing high pressure metering means for controlling the quantity of fuel delivered by the pump.

4. In a device of the character described, a drive shaft, a rotor having a fuel injection pump portion, a fuel metering portion and a fuel distributing portion operatively connected to said drive shaft, said metering portion and distributing portion being on opposite sides of said pumping portion, said injection pump portion having a transverse bore, piston means in said bore, cam means surrounding said piston means for effecting reciprocation of said piston means upon rotation of said rotor, said rotor having a bore connecting said injection pump portion with said fuel metering portion and said fuel distributing portion, a plurality of outlets adapted to communicate successively with said fuel distributing portion, said fuel metering portion including a spill or bypass port and adjustable means for controlling the quantity of fuel spilled or bypassed and providing high pressure metering means for controlling the quantity of fuel delivered by the pump and a delivery valve in the fuel path between said pumping portion and said distributing portion.

5. In a device of the character described, a drive shaft, a rotor operatively connected to said drive shaft and adapted to be rotated thereby, said rotor being parallel with said drive shaft and having a pumping portion, a distributing portion and a metering portion, said metering portion and distributing portion being on opposite sides of said pumping portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion.

6. In a device of the character described, a drive shaft, a rotor operatively connected to said drive shaft and adapted to be rotated thereby, said rotor being parallel with said drive shaft and having a pumping portion, a distributing portion and a metering portion, said metering portion and distributing portion being on opposite sides of said pumping portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion and a delivery valve in the fuel path between said pumping portion and said outlets.

7. In a device of the character described, a drive shaft, a rotor operatively connected to said drive shaft and adapted to be rotated thereby, said rotor being parallel with said drive shaft and having a pumping portion, a distributing portion and a metering portion, said metering portion and distributing portion being on opposite sides of said pumping portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion, said high pressure metering means comprising a bypass port in said rotor communicating with said fuel passage and means for controlling the passage of fuel through said bypass port.

8. In a device of the character described, a drive shaft, a rotor operatively connected to said drive shaft and adapted to be rotated thereby, said rotor being parallel with said drive shaft and having a pumping portion, a distributing portion and a metering portion, said metering portion and distributing portion being on opposite sides of said pumping portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion, said high pressure metering means comprising a bypass port in said rotor communicating with said fuel passage and means for controlling the passage of fuel through said bypass port comprising a sleeve surrounding said rotor adjacent said bypass port and means for adjusting the relative positions of said sleeve and port.

9. In a device of the character described, a drive shaft, a rotor operatively connected to said drive shaft and adapted to be rotated thereby, said rotor being parallel with said drive shaft and having a pumping portion, a distributing portion and a metering portion, said metering portion and distributing portion being on opposite sides of said pumping portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivery by said pumping portion, said high pressure metering means comprising a bypass port in said rotor communicating with said fuel passage and helical groove means for controlling the passage of fuel through said bypass port.

10. In a device of the character described, a drive shaft, a rotor operatively connected to said drive shaft and adapted to be rotated thereby, said rotor being parallel with said drive shaft and having a pumping portion, a distributing portion and a metering portion, said metering portion and distributing portion being on opposite sides of said pumping portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion, said high pressure metering means comprising a bypass port in said rotor communicating with said fuel passage and means for controlling the passage of fuel through said bypass port, said means for controlling the passage of fuel through said bypass port comprising a sleeve surrounding said rotor adjacent said bypass port, said sleeve having a helical slot, and means for adjusting the relative positions of said sleeve and port.

*11. In a device of the character described, a drive shaft, a rotor having a fuel injection pump portion, a fuel metering portion and a fuel distributing portion operatively connected to said drive shaft, said injection pump portion having a transverse bore, piston means in said bore, cam means surrounding said piston means for effecting reciprocation of said piston means upon rotation of said rotor, said rotor having a bore connecting said injection pump portion with said fuel metering portion and said fuel distributing portion, a plurality of outlets adapted to communicate successively with said fuel distributing portion, said fuel metering portion including a spill or bypass port and adjustable means for controlling the quantity of fuel spilled or by-passed and providing high pressure metering means for controlling the quantity of fuel delivered by the pump, said adjustable means for controlling the quantity of fuel bypassed by the pump being rotatable for controlling the timing of injection by the pump.*

*12. In a device of the character described, a drive shaft, a rotor operatively connected to said drive shaft and adapted to be rotated thereby, said rotor being parallel with said drive shaft and having a pumping portion, a distributing portion and a metering portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion, said high pressure metering means comprising a bypass port in said rotor communicating with said fuel passage and means for controlling the passage of fuel through said bypass port comprising a sleeve surrounding said rotor adjacent said bypass port and means for adjusting the relative positions of said sleeve and port and means for rotating said sleeve surrounding said rotor for controlling the timing of injection by the pump.*

*13. In a device of the character described, a drive shaft, a rotor operatively connected to said drive shaft and adapted to be rotated thereby, said rotor being parallel with said drive shaft and having a pumping portion, a distributing portion and a metering portion, a fuel passage connecting said pump portion, distributing portion and metering portion, said pumping portion having a transverse bore communicating with said fuel passage and piston means in said bore, cam means adjacent the periphery of said pumping portion and effecting reciprocation of said piston means upon rotation of said rotor, a plurality of outlets adapted to communicate successively with said distributing portion upon rotation of said rotor, said metering portion providing high pressure metering means communicating with said pumping portion for controlling the quantity of fuel delivered by said pumping portion, said high pressure metering means comprising a bypass port in said rotor communicating with said fuel passage and means for controlling the passage of fuel through said bypass port comprising a sleeve surrounding said rotor adjacent said bypass port, said sleeve having a helical slot, and means for adjusting the relative positions of said sleeve and port, said sleeve surrounding said rotor being rotatable for adjusting the timing of injection by the pump.*

*14. In a device of the character described, a drive shaft, a rotor having a fuel metering por-*

*tion and a fuel distributing portion operatively connected to said drive shaft, a fuel passage in said rotor communicating with said distributing portion, a plurality of outlets communicating successively with said distributing portion, an injection pump communicating with said fuel passage and adapted to supply fuel thereto, a port in said rotor and communicating with said fuel passage, a member longitudinally and rotatably adjustable relative to said port for controlling the quantity of fuel delivered to said outlets, and for controlling the timing of injection.*

*15. In a device of the character described, a drive shaft, a rotor having a fuel metering portion and a fuel distributing portion operatively connected to said drive shaft, a fuel passage in said rotor communicating with said distributing portion, a plurality of outlets communicating successively with said distributing portion, an injection pump communicating with said fuel passage and adapted to supply fuel thereto, a port in said rotor and communicating with said fuel passage, a longitudinally and rotatably adjustable member having port means in cooperative relation with said port in said rotor for controlling the quantity of fuel delivered to said outlets and for controlling the timing of injection.*

*16. In a device of the character described, a drive shaft, a rotor having a fuel metering portion and a fuel distributing portion operatively connected to said drive shaft, a fuel passage in said rotor communicating with said distributing portion, a plurality of outlets communicating successively with said distributing portion, an injection pump communicating with said fuel passage and adapted to supply fuel thereto, a bypass port in said rotor and communicating with said fuel passage, a longitudinally and rotatably adjustable member in cooperative relation with said bypass port for controlling the quantity of fuel delivered to said outlets and for controlling the timing of injection.*

*17. In a device of the character described, a drive shaft, a rotor having a fuel metering portion and a fuel distributing portion operatively connected to said drive shaft, a fuel passage in said rotor communicating with said distributing portion, a plurality of outlets communicating successively with said distributing portion, an injection pump communicating with said fuel passage and adapted to supply fuel thereto, a bypass port in said rotor and communicating with said fuel passage, a longitudinally and rotatably adjustable member having port means in cooperative relation with said bypass port for controlling the quantity of fuel delivered to said outlets and for controlling the timing of injection.*

References Cited in the file of this patent or the original patent

UNITED STATES PATENTS

| Number | Name | Date |
|---|---|---|
| 2,391,221 | Beeh | Dec. 18, 1945 |
| 2,518,473 | Hogeman et al. | Aug. 15, 1950 |
| 2,622,577 | Retel | Dec. 23, 1952 |

FOREIGN PATENTS

| Number | Country | Date |
|---|---|---|
| 657,759 | Great Britain | Sept. 26, 1951 |